United States Patent [19]

Anderson et al.

[11] 4,315,521
[45] Feb. 16, 1982

[54] FLUID PRESSURE SIGNAL CONTROLLER

[75] Inventors: Patrick J. Anderson, Hoffman Estates; Andrew A. Kenny, Roselle, both of Ill.

[73] Assignee: Eaton Corporation, Cleveland, Ohio

[21] Appl. No.: 146,903

[22] Filed: May 5, 1980

[51] Int. Cl.³ ............................................. G05D 16/00
[52] U.S. Cl. ...................................... 137/85; 251/263; 236/79
[58] Field of Search ............................ 137/85, 86, 82; 251/251, 263; 236/13, 87, 49, 79

[56] References Cited

U.S. PATENT DOCUMENTS

| | | | |
|---|---|---|---|
| 2,550,011 | 4/1951 | Kohler | 251/251 X |
| 3,015,963 | 1/1902 | Terry | 251/263 X |
| 3,476,316 | 11/1969 | Franz | 236/87 X |
| 3,770,195 | 11/1973 | Franz | 236/13 |
| 3,831,841 | 8/1974 | Franz | 236/13 |
| 3,856,045 | 12/1974 | Kenny | 137/625.11 |
| 4,245,780 | 1/1981 | Franz | 236/13 |

Primary Examiner—Alan Cohan
Attorney, Agent, or Firm—R. A. Johnston; R. J. McCloskey

[57] ABSTRACT

A fluid pressure and electrical signal controller for providing a predetermined regulated vacuum signal from a variable source in response to changes in position of a rotatable input shaft when attached thereto and an electrical signal at a predetermined position of the input shaft. A pressure force balance type vacuum modulator valve is preloaded and biased by a spring connected to a cam follower which tracks a rotary cam turned by the input shaft. The modulator valve is slidably attached to the controller body for adjusting the preload length of the spring and a rotatable adjustment ring engages the valve and is threadedly received on the controller body for effecting sliding adjustment of the valve position on the controller body.

25 Claims, 11 Drawing Figures

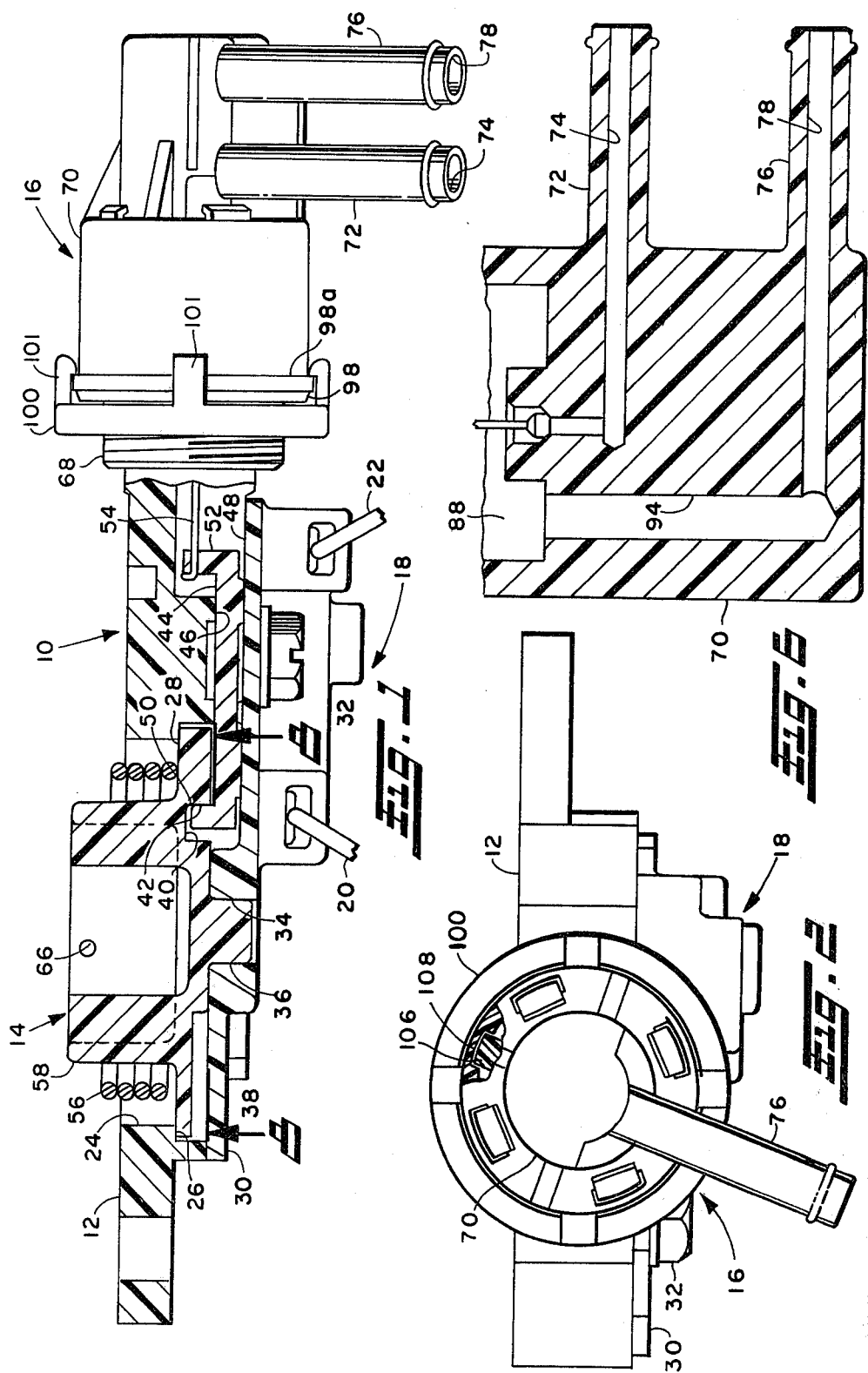

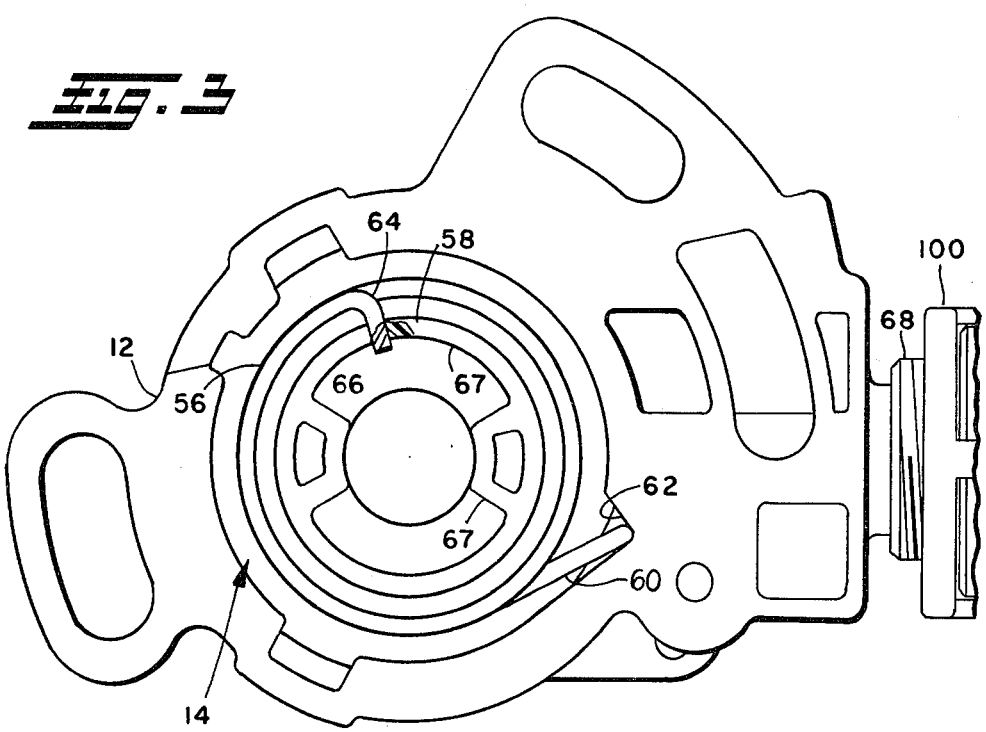
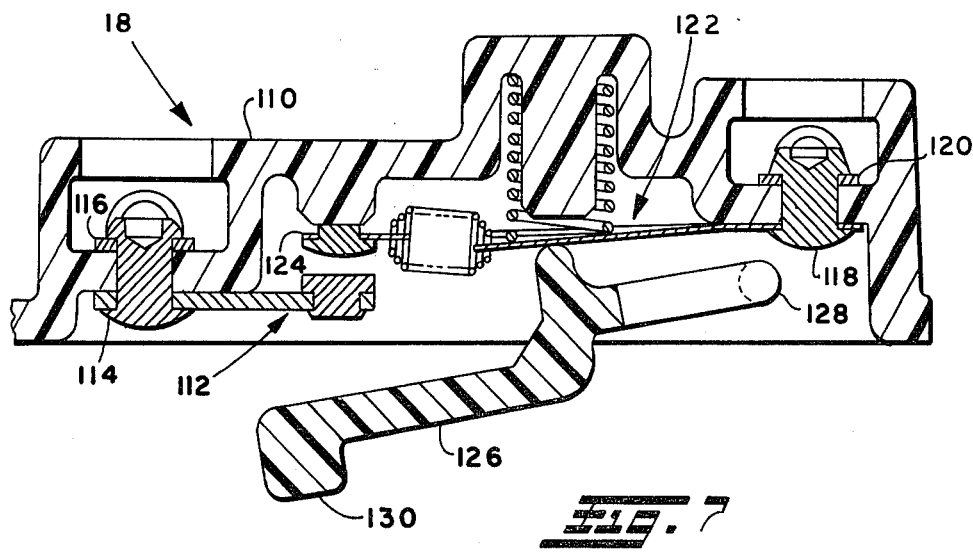

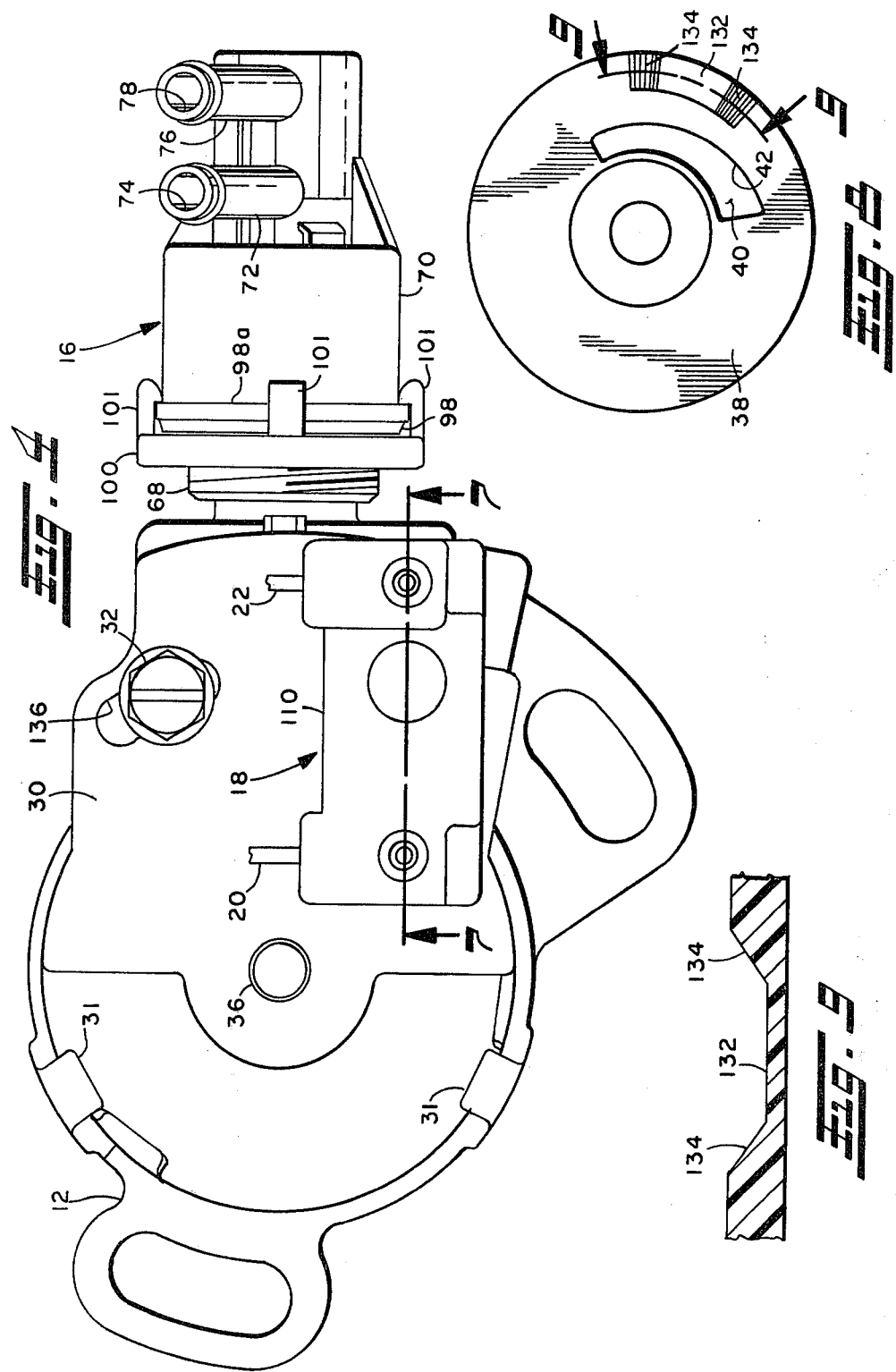

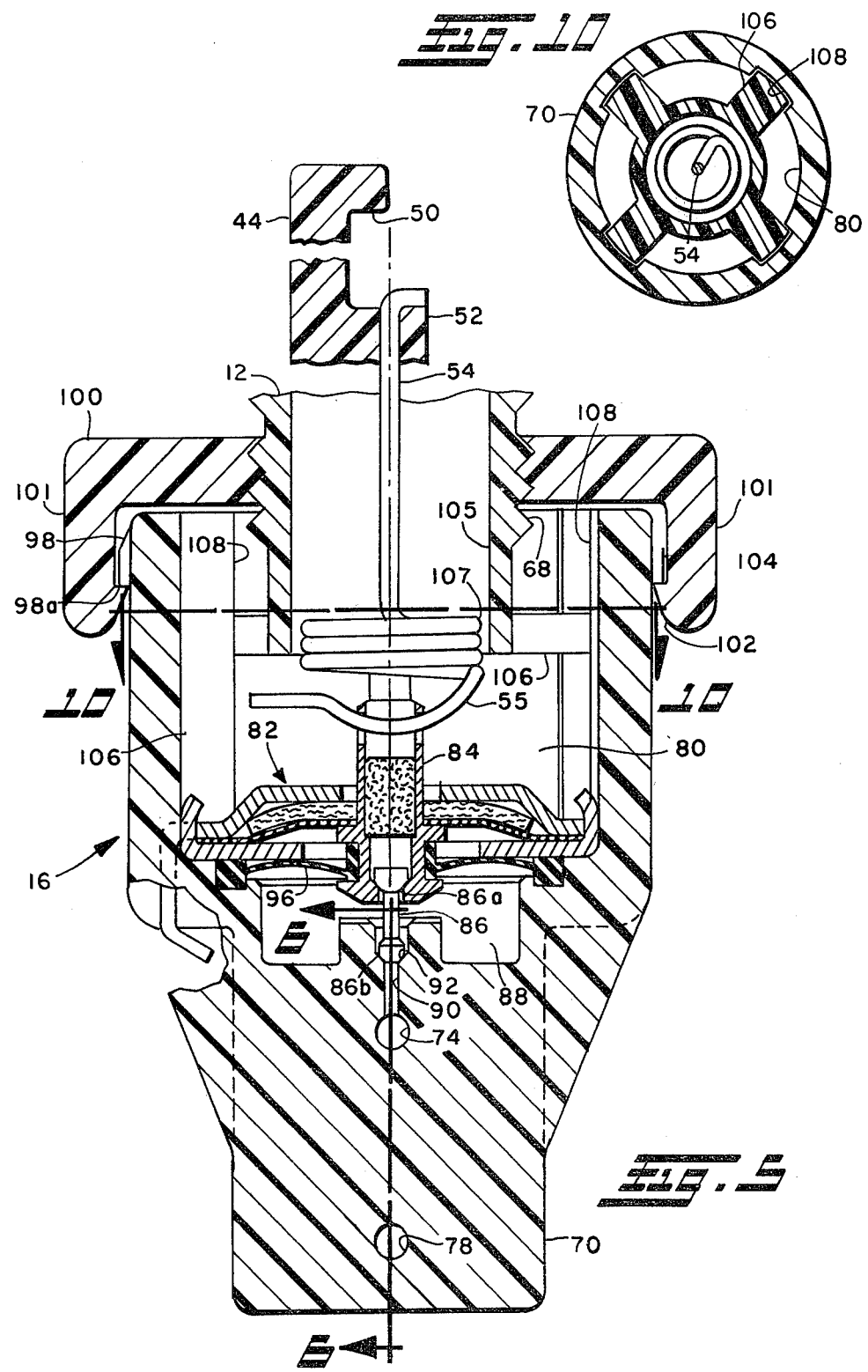

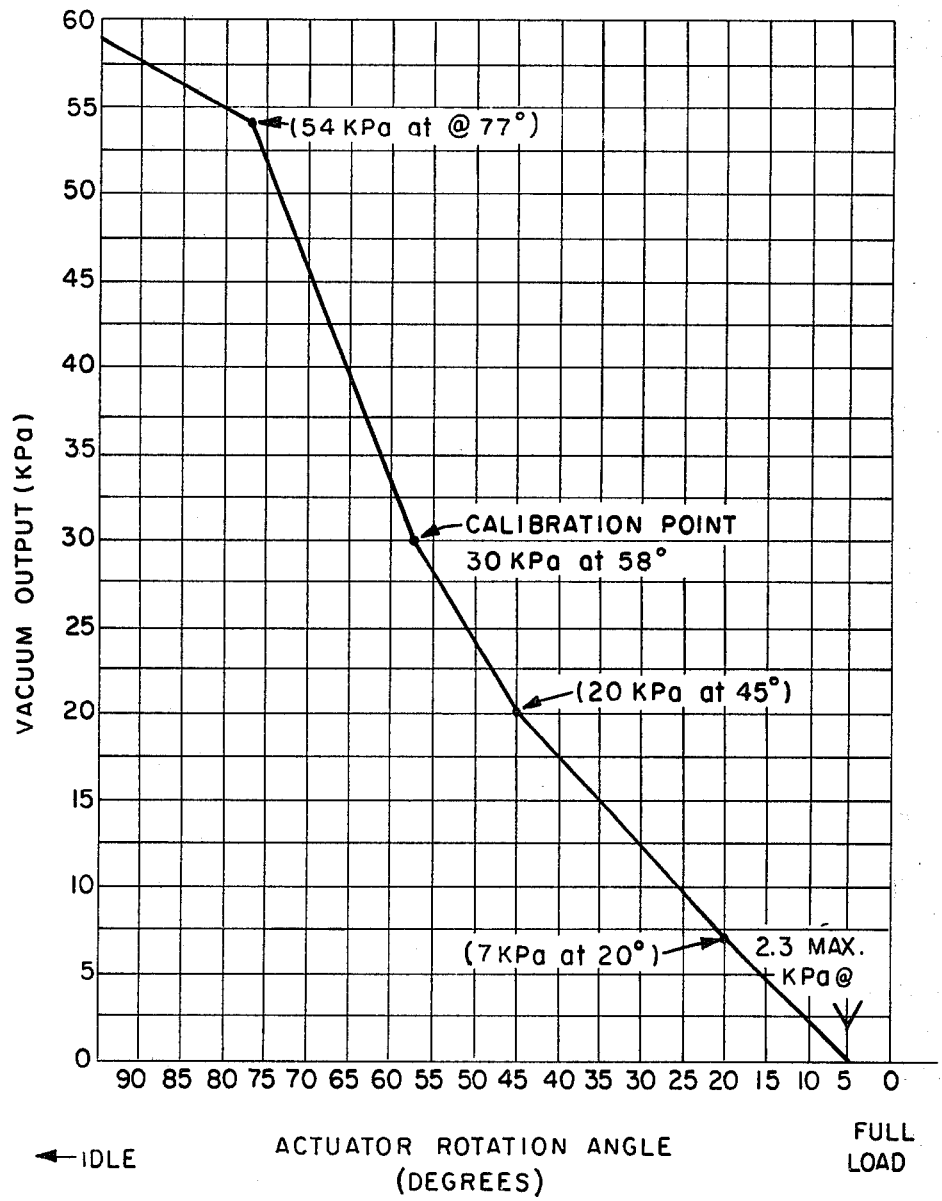

FLUID PRESSURE SIGNAL CONTROLLER

BACKGROUND OF THE INVENTION

The present invention relates to fluid pressure controllers and particularly controllers of the type which provide a regulated output signal when connected to a source of variable fluid pressure and which are responsive to a mechanical input to alter the desired value of the regulated output signal. Devices of this type are employed in accessory controls for internal combustion engines in automotive applications where it is desired to provide a regulated and selectively changeable fluid pressure vacuum signal responsive to movement of the engine throttle and also to provide for the completing and the breaking of an electrical circuit at a predetermined position of the mechanical input such as the vehicle throttle position. An example of such an application is a vacuum controller which provides a regulated vacuum signal, upon connection to the vacuum pump source and receives an input from the vehicle throttle to provide changes in the regulated vacuum output signal in accordance with the predetermined scheduled throttle position for actuating an exhaust gas recirculation control valve. The electrical circuit which is completed and broken at predetermined throttle position may be employed to actuate and de-actuate an electrically operated transmission shift control mechanism.

It is known to provide a rotary cam for adjusting the bias force on a pressure force-balance type vacuum modulator valve for adjusting the level of a regulated vacuum output signal. An example of such a device is that shown and described in U.S. patent application Ser. No. 88,806 filed Oct. 29, 1979, in the names of R. J. Franz, V. DeVera and J. Dahlstrom and assigned to the assignee of the present application. The aforesaid Franz et al. application employs a rotating cap which engages an annular helical cam disposed therewithin for effecting axial movement of the cam to vary the preload on a tension spring connected to provide a variable bias on a pressure responsive modulator valve for providing a regulated vacuum output signal.

Such devices as that described in the Franz et al. application are employed for providing a regulated vacuum signal from varying source, such as a vacuum pump source, for use in controlling devices such as transmissions and exhaust gas recirculation valves.

Another known vacuum signal controller is that described in U.S. patent application Ser. No. 897,604 filed Apr. 18, 1978, now U.S. Pat. No. 4,245,789 issued Jan. 20, 1981 in the name of R. J. Franz and assigned to the assignee of the present invention. The Franz device utilizes a rotating cam to vary the preload on a temperature sensitive element operated vacuum modulator valve.

SUMMARY OF THE INVENTION

The present invention provides a fluid pressure signal controller responsive to a mechanical input to vary the level of a regulated fluid pressure signal upon connection of the controller to the source of variable fluid pressure. The controller also contains an electrical switching mechanism responsive to the mechanical input to provide making and breaking of an electrical circuit at predetermined positions of the mechanical input. The novel controller of the present invention finds particularly useful application in controlling exhaust gas recirculation (EGR) valve for an internal combustion engine and particularly diesel engines having the throttle connected to the fuel supply feed to the combustion chambers for controlling engine speed at any given engine load.

The controller of the present invention employs a diaphragm actuated pressure-operated force-balance modulator valve responsive to a mechanical preload to provide a regulated fluid pressure output signal of a desired level, irrespective of normal variations in the fluid pressure supply. The present controller when employed in the aforementioned diesel engine application, is connected to the vacuum pump for the fluid pressure source, and has a rotary cam adapted for attachment to a rotatable shaft connected directly to the engine fuel injection throttle mechanism. The rotatable cam causes linear movement of a slidable cam follower which is connected to a preload spring attached to the modulator valve diaphragm wherein movement of the cam follower varies the preload on the modulator valve diaphragm. The preload on the modulator valve diaphragm serves to alter the level of the regulated fluid pressure signal provided at the output of the modulator valve. An electrical switch is mounted such that the switch actuator also follows the rotary cam and the rotary cam is operative to effect actuation and deactuation of the switch. The rotary cam, cam follower, electrical switch mechanism and modulator valve are mounted to a common body portion.

The present invention thus provides a solution to the above-described problems with heretofore known rotary cam adjustable vacuum regulator valve assemblies by employing unique structural arrangement wherein the modulator valve is slidably mounted on the base or body. A threaded ring is provided, rotation of which adjusts the position of the modulator valve with respect to the body for adjusting the initial preload on the diaphragm bias spring thereby permitting ease of calibration of the controller.

The present invention thus provides a novel controller for providing a regulated fluid pressure signal from a variable source of fluid pressure and an electrical switching function, wherein the level of the regulated fluid pressure signal and the point of actuation of the switching function are determined by the position of a rotatable cam provided on the controller. The controller employs a diaphragm actuated pressure operated force-balance modulator valve, the bias of which is varied in service from the rotary cam connected to a preload spring attached to the diaphragm. The modulator valve is slidably adjusted with respect to the cam for readily adjusting the calibration by rotation of a ring threadedly engaging the modulator valve for slidably adjusting the valve position with respect to the controller body. Movement of the valve position on the controller body effects a change in the length of the bias spring which in turn changes the calibration of the modulator valve output signal for any given position of the input cam.

BRIEF DESCRIPTION OF THE DRAWINGS

FIG. 1 is an elevation view of the controller of the present invention with portions of the body and rotary cam broken away to illustrate the assembly of the cam follower;

FIG. 2 is a right-hand end view of the controller of FIG. 1;

FIG. 3 is a top view of the controller of FIG. 1;

FIG. 4 is a bottom view of the controller of FIG. 1;

FIG. 5 is an enlarged section view through the longitudinal center-line of the modulator valve of the controller of FIG. 1;

FIG. 6 is a section view taken along section-indicating lines 6—6 of FIG. 5;

FIG. 7 is a section view taken along section-indicating lines 7—7 of FIG. 4;

FIG. 8 is a section view taken along section-indicating lines 8—8 of FIG. 1 and shows the cam surfaces of the rotary cam.

FIG. 9 is a section view taken along section-indicating lines 9—9 of FIG. 8;

FIG. 10 is an enlarged section view taken along section-indicating lines 10—10 of FIG. 5;

FIG. 11 is a graph of vacuum signal level plotted as a function of the rotary cam position.

DETAILED DESCRIPTION

Referring now to FIGS. 1-4, the controller 10 of the prsent invention is shown as having a body or base 12 with a rotary cam indicated generally at 14 mounted thereon on the upper face thereof and a modulator valve assembly indicated generally at 16 slidably mounted at the right-hand end thereof with respect to FIG. 1. An electrical switching mechanism indicated generally at 18 is provided on the under surface of the body and has electrical leads 20, 22 provided thereon for attachment to a circuit to be switched.

The body 12 has a bore 24 formed therein with an annular shoulder 26 formed in the bore. The upper surface of a flange 28 provided on rotary cam 14 is slidably registered against shoulder 26. Cam 14 is retained in bore 24 by a cover 30 retained on the body 12 by suitable fastening expedients as, for example locking tabs 31 (see FIG. 4) and a self-tapping screw 32. Cover 30 has a bore 34 provided therein and the cam 14 has a pilot 36 journaled in bore 34 for guiding and locating the cam flange 28 on the annular shoulder 26.

Referring to FIGS. 1, 8 and 9, the undersurface 38 of the cam flange 28 is shown as having a recess 40 formed therein with a variable radius wall portion forming a cam surface 42. A cam follower 44 is slidably received in a recess 46 provided in the undersuface of body 12 and is slidably guided therein and retained by the upper surface 48 of cover 30. The left end of cam follower 44 in FIG. 1 has an upwardly extending portion with a cam following surface 50 formed thereon which registers against the cam surface 42 of the rotary cam. The right-hand end of cam follower 44 also has an upwardly extending portion 52 which has an aperture provided therein with one end 54 of a tension spring received in the aperture and retained therein by deformation of the end of the spring.

Referring to FIGS. 1 and 3, a torsion spring 56 is received over the cylindrical surface 58 of cam 14, with one end 60 of spring 56 registered in a notch 62 provided in the body 12 and the other end 64 of spring 56 bent at right angles to the coil of the spring and received in an aperture 66 formed in the cylindrical surface 58 of the cam.

Referring particularly to FIG. 3, the upper portion of cam 14 has a pair of arcuately shaped recesses 67 provided therein, the ends of which are adapted to receive diametrically thereacross a torsional driving member therein as, for example, a flat blade member (not shown). In operation, with such a torsional driving member (not shown) engaging the arcuate recesses 67, and upon rotation of cam 14, cam follower 44 is moved in a horizontal direction to vary the position of spring end 54. The body 12 has, at the right end thereof, with respect to FIG. 1, a threaded portion 68 for receiving adjustably thereon the modulator valve 16 as will be hereinafter described in greater detail.

In the presently preferred practice of the invention, the rotary cam 58, body 12, cam follower 44, and cover 30 are made of plastic material suitable for service in a vehicle engine compartment environment.

Referring now to FIGS. 1, 5 and 6, the modulator valve 16 will now be described in greater detail as having a body 70 having provided thereon a vacuum source nipple 72 having therein a vacuum source port 74 and spaced therefrom a signal output nipple 76 having therein a signal port 78. The nipples 72 and 76 are adapted to have received over the ends thereof a suitable hose for connection to, respectively, a source of vacuum and a vacuum operated device to be controlled.

Referring particularly to FIG. 5, the upper portion of body 70 has a cylindrical cavity 80 formed therein, which cavity has received and retained therein a diaphragm vent-valve subassembly indicated generally at 82 received and retained therein. The vent valve subassembly 82 includes a vent seat member 84 having the lower end 55 of the tension spring received therein through a transverse aperture. The vent seat member 84 is thus biased in an upward direction with respect to FIG. 5 by the end 55 of the spring. The vent valve subassembly 82 includes a movable valve member 86 having at its upper end a vent valve seating surface 86a and at its lower end a vacuum valve surface 86b.

Valve body 70 has a signal chamber 88 formed therein below cavity 80 which chamber 88 has a central passage 90 provided therein communicating with vacuum supply ports 74. Passage 90 has at the upper end thereof a vacuum valve seating surface 92 against which valve surface 86b is moved to provide a valving action to control fluid flow between chamber 88 and supply port 74. Referring to FIG. 6 passage 94 is provided in valve body 70 which communicates signal chamber 88 with signal output port 76.

The diaphragm vent-valve subassembly 82 includes a resilient annular diaphragm 96, preferably formed of a suitable elastomeric material, having its outer periphery sealed therearound against body 70, with its inner periphery sealed about vent seat member 84 to complete the upper wall of signal chamber 88. In the presently preferred practice, the body 70 is molded of a plastic material suitable for vehicle engine compartment service.

In operation, diaphragm 96, responsive to the difference in pressure in cavity 80 thereabove, and signal chamber 88 therebelow, causes vent seat member 84 to move vertically to seek a force balance equilibrium as against the upward tension force of spring end 54a. The movement of vent seat member 84 causes seating and unseating of valve surfaces 86a and 86b which in turn alternately prevents and blocks fluid flow between chamber 88 and the vacuum port 74 to maintain a regulated pressure in chamber 88 and thus a regulated signal to port 78. The details of the operation of modulator valve 16 are well known in the art and a more detailed description thereof may be found in the published literature as, for example, U.S. Pat. Nos. 3,779,195 and 3,831,841 and accordingly, further description herein has been omitted for the sake of brevity.

Referring to FIGS. 1, 4 and 5, the upper portion of body 70 (leftward portion in FIGS. 1 and 4) has an annular flange 98 extending outwardly therefrom with the lower face thereon 98a as shown in FIG. 5 (rightward face in FIGS. 1 and 4) extending preferably generally right angles to the outer periphery of the upper portion of body 70.

An annular adjustment ring 100 is provided having the inner periphery thereof threadedly received over the threads 68 provided on the end of the body 12. The ring 100 has a plurality of axial tabs 101 extending downwardly therefrom with respect to FIG. 5 (rightwardly with respect to FIGS. 4 and 1) and circumferentially, preferably equally spaced, arrangement. Each of the tabs 101 has an inwardly extending lug 102 provided on the lower end thereof which lug 102 has a radial shoulder 104 provided thereon for engagement with the face 98a of the body flange 98. In the presently preferred practice of the invention, the ring 100 is made of a plastic material suitable for vehicle engine compartment service and the tabs 101 are dimensioned and configured so as to be slightly radially deformable to permit snap assembly of the lugs 102 over flange 98.

The lower threaded portion of body 12 has a plurality of radially outwardly extending lugs 106 provided thereon which lugs are spaced in circumferentially equally spaced arrangement about the lower portion of the body 12 as shown in FIG. 5. Corresponding grooves 108 are provided in the wall of cavity 80 to permit sliding assembly of the lugs 106 into the cavity 80 in a manner preventing relative rotation of the valve body 70 with respect to the threaded portion of body 12.

As the ring 100 is rotated the shoulder portion 104 of each of the tabs 101 rotates with respect to the shoulder portion 98a of body flange 98 such that the lugs 102 slide on the shoulder 982; and, the threads on the inner periphery of ring 100 rotate about the threads on body 12, thereby causing vertical movement of the body 12 with respect to the cavity 80 in the valve body 70. The vertical movement of the body 12 causes cam follower 44 to alter the tension on spring 54 and thus change the preload on the seat member 84. Therefore, by merely rotating ring 100 the calibration of the regulated output signal from modulator valve 16 may be changed selectively. It will be understood however that such calibration is valid only for a fixed position of cam 58; and, that once ring 100 has been set to the desired preload calibration, variations in the regulated value of the output signal are thereafter effected by rotation of cam 58 during engine operation.

Referring now to FIGS. 5 and 10, the lower portion of body 12 is shown as having a spring-receiving cavity 105 formed centrally within the region of threads 68. Cavity 105 is configured to provide adequate clearance for axial or vertical movement of the coil 107 of the tension spring. The lower end of body 12 has provided thereon a plurality of radially outwardly extending guide lugs 106 which are each slidably received respectively in a corresponding groove 108 formed in the wall of chamber 80 of valve body 70. The lugs 106 function to guide axial movment of the valve body 70 on controller body 12, and to further prevent relative rotation therebetween upon rotation of annular calibration ring 100 about threads 68.

Referring now to FIGS. 1, 4, 7 and 8, the electrical switching meachanism 18 is shown in detail in FIG. 7, which is inverted with respect to the orientation of FIG. 1. The switch 18 has a housing 110 with a stationary contact assembly, indicated generally at 112, secured to the housing 110 by suitable fastener, as for example, rivet 114, which retains a terminal 116 which has connected thereto electrical lead 120. A second terminal is provided by a fastener, such as rivet 118, which secures terminal 120 to the housing, which terminal has attached thereto the electrical lead 122. Rivet 118 also attaches to the housing a snap-acting switchblade mechanism, indicated generally at 122, which has attached thereto movable contact 124 for making and breaking an electrical circuit between contact 124 and stationary contact assembly 112.

An actuator member 126 is provided and is pivotally mounted on housing 110, at the right end thereof with respect to FIG. 7, by portion 128 received in an aperture provided in the wall of housing 110. The actuator 126 has provided thereon a cam follower 130 shown on the left end thereof in FIG. 7, which cam follower is received against a cam surface provided on rotary cam face 38 as will be hereinafter described.

Referring to FIGS. 8 and 9, an arcuate recess 132 is provided about a sector of the outer periphery of the lower face of cam flange 38, the recess 132, having ramps 134 provided at the ends thereof. The cam follower 130 of switch actuator 126 is received in the recess 132; and, so long as cam follower 130 is not engaged in either of the cam surfaces 134 or the surface 38, switch 18 is not actuated.

Upon rotation of cam 58, such that either of the cam surfaces 134 contacts cam follower 130, the actuator arm 126 is moved to cause snap-over of the switch blade mechanism 122 and contact between switch contacts 124.

Referring to FIG. 4, cover 30 is shown an having an arcuate slot 136 provided therein for receiving the fastener 32 in such a manner as to permit rotation of the cover 30 with respect to body 12 by loosening of fastener 32. With housing 110 of switch 18 secured to the cover 30, rotation of the cover 30 causes rotary movement of the cam follower 30 with respect to the recess 132 and thereby permits adjustment of the position of cam follower 30 with respect to cam surfaces 134 for an initial or at-rest position of cam surface 38.

Referring now to FIG. 11, a signal output graph is shown for one presently used embodiment of the invention. FIG. 11 shows the signal output plotted as ordinates as a function of angle of rotation of cam 14 plotted as obsciscae. It will be understood by those skilled in the art that the choice of diaphragm area, force constant of the tension spring and configuration angular position of cam surface 42 are suitably chosen to give the desired signal output which may differ, as desired, from the relationship shown in FIG. 11.

The present invention thus provides a fluid pressure signal controller having a regulated fluid pressure output signal which may be selectively varied by a mechanical input as, for example, the position of a rotary shaft connected to an internal combustion engine throttle. A switch mechanism is also actuated by movement of a cam rotated by the mechanical input. The value of the regulated fluid pressure output signal is controlled by a force-balance type modulator valve having the preload or bias thereon varied during service operation by movement of the mechanical input.

The modulator valve is attached to the controller body by a slidable mounting which is easily and conveniently adjusted by rotation of an annular ring threadedly connected to the body. The present invention thus provides an easily calibrated and adjusted fluid pressure signal controller having accompanied therewith an electrical switching function.

Although the invention has been hereinabove described with respect to the presently preferred practice, it will be apparent to those having ordinary skill in the art that the invention is capable of modification and variation and is limited only by the scope of the following claims.

We claim:

1. A fluid pressure signal controller comprising:
   (a) support means;
   (b) cam means rotatably mounted on said support means, said cam means being adapted for connection to a rotatable input shaft for rotation thereby;
   (c) cam follower means movably received on said support means and operative to provide substantially rectilinear movement in response to rotation of said cam means;
   (d) valve means movably mounted on said support means, said valve means providing, upon connection to a source of variable fluid pressure, a regulated fluid pressue output signal, said valve means including a valve seat and a valve member movable with respect thereto for regulating said output signal and means biasing said valve means for altering said regulated output signal, wherein said cam follower means is operatively connected to said biasing means for varying the bias on said valve means in response to rotary movement of said cam means; and
   (e) means for adjusting the position of said valve means with respect to said support means for altering the calibration of said valve means with respect to a given position of said cam means.

2. The device defined in claim 1, further comprising switch means mounted on said support means, said switch means including actuator means operatively contacting said cam means for actuating said switch means in response to rotary movement of said cam means.

3. The device defined in claim 1, wherein said cam follower means comprises a member slidably mounted on said support means.

4. The device defined in claim 1 further comprising switch means mounted on said support means and wherein said cam follower comprises a member slidably mounted on said support means, said switch means including actuator means operatively contacting said cam follower.

5. The device defined in claim 1, wherein said valve means includes a member threadedly connected to said support means and operable upon rotation with respect thereto for adjusting the bias on said valve means.

6. The device defined in claim 1, further comprising means biasing said cam means in a predetermined direction of rotation.

7. The device defined in claim 1, wherein said means for adjusting the position of said valve means includes an annular ring rotatable with respect to said support means.

8. The device defined in claim 1, wherein said means for adjusting the position of said valve means with respect to said support means includes an annular ring threadedly received on said support means and rotatable with respect thereto.

9. A fluid pressure signal controller comprising:
   (a) support means;
   (b) cam means rotatably mounted on said support means, said cam means being adapted for connection to a rotatable input shaft for rotation thereby;
   (c) cam follower means movably received on said support means and operative to move in response to rotation of said cam means;
   (d) valve means movably attached to said support means, said valve means including:
      (i) means defining a fluid pressure chamber and including pressure responsive means movably responsive to the difference between the fluid pressure in said chamber and atmospheric pressure,
      (ii) means defining a fluid pressure supply port communicating with said chamber and adapted for connection to a source of fluid pressure,
      (iii) means defining a fluid pressure signal output port communicating with said chamber and adapted for connection to a fluid pressure actuated device,
      (iv) means defining an atmospheric vent port in said chamber
      (v) a valve member operative in response to movement of said pressure responsive means to control fluid flow through said supply port and said vent port for regulating the pressure in said chamber;
   (e) means operative to bias movement of said pressure responsive means, said bias means being operatively connected to said cam follower such that movement of said cam follower varies the bias on said pressure responsive means; and
   (f) means for adjusting the position of said valve means on said support means for effecting changes in the bias on said pressure responsive means.

10. The device defined in claim 9, wherein said bias means includes spring means and said valve means includes an adjustment member threadedly engaging said support means, wherein rotation of said adjustment member with respect to said support means provides adjustment of said spring means for altering the bias on said pressure responsive means.

11. The device defined in claim 9, wherein said bias means includes tension spring means having an end connected to said pressure responsive means and the other adjustably connected to said support means.

12. The device defined in claim 9, wherein said bias means includes spring means and said valve means includes a member rotatably connected to said support means, wherein rotation of said member with respect to said support means effects adjustment of said spring means for altering the bias on said pressure responsive means.

13. The device defined in claim 9, further comprising switch means having an actuating member contacting said cam follower and having a pair of electrical terminals adapted for connection thereto and operable for making and breaking a circuit between said terminals in response to movement of said cam follower.

14. The device defined in claim 9, wherein said cam follower means includes a member slidably received on said support means.

15. The device defined in claim 9 further comprising switch means having an actuating member contacting said cam follower and having a pair of electrical terminals adapted for connection thereto and including snap-acting means operable for making and breaking a circuit between said terminals in response to movement of said actuator member.

16. The device defined in claim 9, wherein said cam means comprises a member having a surface generally transverse to the axis of rotation thereof with a recess formed in said transverse surface and having said cam follower engaging certain surface portions of said recess.

17. The device defined in claim 9, wherein said support means includes means defining a pair of spaced guide surfaces with said cam follower slidably received therein.

18. The device defined in claim 9, wherein said valve means is adjustably mounted on said support means for movement in a radial direction with respect to said cam means for altering the effect of said biasing means on said valve means.

19. The device defined in claim 9, wherein said valve means includes adjustment means rotatably received thereon, said adjustment means including a member having portions thereof in threadedly engagement with said support means, wherein, upon rotation of said adjustment means, said valve means is moved radially with respect to said cam means for altering the effect of said biasing means on said valve means.

20. A fluid pressure and electrical signal controller comprising:
   (a) support means;
   (b) cam means rotatably mounted on said support means, said cam means being adapted for connection to a rotatable input shaft for rotation thereby;
   (c) cam follower means movably received on said support means and operative to move in response to rotation of said cam means;
   (d) valve means movably mounted on said support means, said valve means providing upon connnection to a source of variable fluid pressure, a regulated fluid pressure output signal, said valve means including structure defining a valve seat and a valve member movable with respect thereto for regulating said output signal;
   (e) means connected to said cam follower means and operative upon movement thereof, for effecting changes in the bias on said valve means for altering said output signal;
   (f) electrical switch means including a pair of electrical terminals adapted for connection thereto, said switch means having an actuator contacting said cam means and operable to complete and break a circuit between said terminals upon actuation and deactuation thereof in response to movement of said cam means; and,
   (g) adjustable means operative to move said valve means with respect to said support means for changing the calibration of said valve means with respect to said cam means.

21. The device defined in claim 20, wherein said cam means includes a member having a surface generally transverse to the axis of cam rotation and having thereon a first cam surface portion contacting said cam follower means and a second cam surface portion contacting said switch actuator.

22. The device defined in claim 20, wherein said support means includes a first member and a second member adjustably mounted thereon for rotational movement with respect to said first member about the axis of rotation of said cam means, and said switch means is mounted on said second member for effecting rotation adjustment of said actuator with respect to said cam means.

23. The device defined in claim 20, wherein said valve means is slidably mounted on said support means and said adjustable means includes a member selectively rotatable with respect to said support means and operable upon movement to effect movement of said valve means with respect to said support means for changing the effect of said bias means on said valve means.

24. The device defined in claim 20, wherein:
   (a) said valve means includes structure defining a valve housing member slidably mounted on said support means; and,
   (b) said bias means includes a member interconnecting said means defining said valve seat and said cam follower means, said interconnecting member providing a preload on said means defining said valve seat and said sliding movement of said valve housing means is operative to vary said preload.

25. The device defined in claim 20, wherein:
   (a) said valve means includes structure defining a valve housing member movably mounted on said support means and includes an adjustment member engaging said valve housing and movable with respect thereto; and,
   (b) said adjustment member has portions therof engaging a cam surface provided on said support means, wherein upon movement of said adjustment member with respect to said valve housing, said cam surface causes said adjustment member to move said valve housing with respect to said support means for altering the effect of said bias means on said valve means.

* * * * *